(12) United States Patent
Arora et al.

(10) Patent No.: US 12,645,564 B2
(45) Date of Patent: Jun. 2, 2026

(54) REAL-TIME FUNCTIONAL CODE REVIEWER WITH ARCHITECTURE PLACEMAT

(71) Applicant: Bank of America Corporation, Charlotte, NC (US)

(72) Inventors: Saurabh Arora, Haryana (IN); Sandeep Kumar Chauhan, Hyderabad (IN); Shailendra Singh, Maharashtra (IN); Sudarshan Veeramreddy, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 18/631,871

(22) Filed: Apr. 10, 2024

(65) Prior Publication Data

US 2025/0321858 A1 Oct. 16, 2025

(51) Int. Cl.
| | |
|---|---|
| *G06F 9/44* | (2018.01) |
| *G06F 8/30* | (2018.01) |
| *G06F 8/41* | (2018.01) |
| *G06F 8/77* | (2018.01) |
| *G06F 9/45* | (2006.01) |
| *G06F 11/36* | (2025.01) |
| *G06F 11/3604* | (2025.01) |
| *G06F 11/3698* | (2025.01) |
| *G06N 20/00* | (2019.01) |

(52) U.S. Cl.
CPC ...... *G06F 11/3616* (2013.01); *G06F 11/3698* (2025.01)

(58) Field of Classification Search
CPC .. G06F 11/3616; G06F 11/3698; G06F 8/427; G06F 8/71; G06F 8/77; G06F 16/23; G06F 8/34; G06F 9/454; G06F 9/44; G06N 3/084; G06N 3/0442; G06N 3/09; G06N 20/00; G06Q 10/063112
See application file for complete search history.

(56) References Cited

U.S. PATENT DOCUMENTS

| | | | |
|---|---|---|---|
| 6,243,076 B1 | 6/2001 | Hatfield | |
| 9,331,856 B1 | 5/2016 | Song | |
| 9,460,351 B2 | 10/2016 | Kim et al. | |

(Continued)

OTHER PUBLICATIONS

"DevOps," https://en.wikipedia.org/wiki/DevOps, Wikimedia Foundation, Inc., Mar. 9, 2021.

(Continued)

*Primary Examiner* — Thuy Dao
(74) *Attorney, Agent, or Firm* — Weiss & Arons LLP

(57) ABSTRACT

Apparatus and methods for creating a real-time functional code reviewer with an architecture placemat are provided. The apparatus and methods may include a server with an artificial intelligence/machine learning ("AI/ML") real-time functional code reviewer program. The real-time functional code reviewer program may receive source code in a markup language for review. The program may analyze the source code. The program may generate functional context feedback, review feedback, and an architecture placemat. A code reviewer, through a user device, may review the functional context feedback, review feedback, and the architecture placemat. The code reviewer may provide feedback to the source code developer.

20 Claims, 7 Drawing Sheets

(56) References Cited

U.S. PATENT DOCUMENTS

| | | | |
|---|---|---|---|
| 9,665,818 B1 | 5/2017 | Cardinal et al. | |
| 9,679,152 B1 | 6/2017 | Young et al. | |
| 9,823,735 B2 | 11/2017 | Spiessl et al. | |
| 11,392,844 B1 * | 7/2022 | Rao | G06F 11/3698 |
| 11,720,686 B1 | 8/2023 | Cross et al. | |
| 12,229,318 B2 * | 2/2025 | Brevoort | H04L 63/104 |
| 2015/0310751 A1 | 10/2015 | Tolia | |
| 2016/0041613 A1 | 2/2016 | Klanner et al. | |
| 2017/0156589 A1 | 6/2017 | Wu et al. | |
| 2017/0214696 A1 | 7/2017 | Cleaver et al. | |
| 2018/0005440 A1 | 1/2018 | Mullins | |
| 2018/0036974 A1 | 2/2018 | Hahn et al. | |
| 2018/0108079 A1 | 4/2018 | Traub | |
| 2022/0035928 A1 | 2/2022 | Siman et al. | |
| 2023/0126950 A1 | 4/2023 | Soudhamma et al. | |
| 2023/0154266 A1 | 5/2023 | Carter | |
| 2023/0179955 A1 | 6/2023 | Williams et al. | |
| 2023/0188991 A9 | 6/2023 | Segal | |
| 2023/0206708 A1 | 6/2023 | Carter | |
| 2023/0216868 A1 | 7/2023 | March et al. | |
| 2023/0224320 A1 | 7/2023 | Irimie et al. | |
| 2023/0261878 A1 | 8/2023 | Madisetti et al. | |

OTHER PUBLICATIONS

"Smartglasses," https://en.wikipedia.org/wiki/Smartglasses, Wikimedia Foundation, Inc., Feb. 21, 2021.
"Wearable Technology-Smart Glasses," https://www.optiscangroup.com/smartglasses Optiscan, Retrieved on Mar. 4, 2021.
"What is DevOps?" https://aws.amazon.com/devops/what-is-devops/, Amazon Web Services, Inc., Retrieved on Mar. 9, 2021.

* cited by examiner

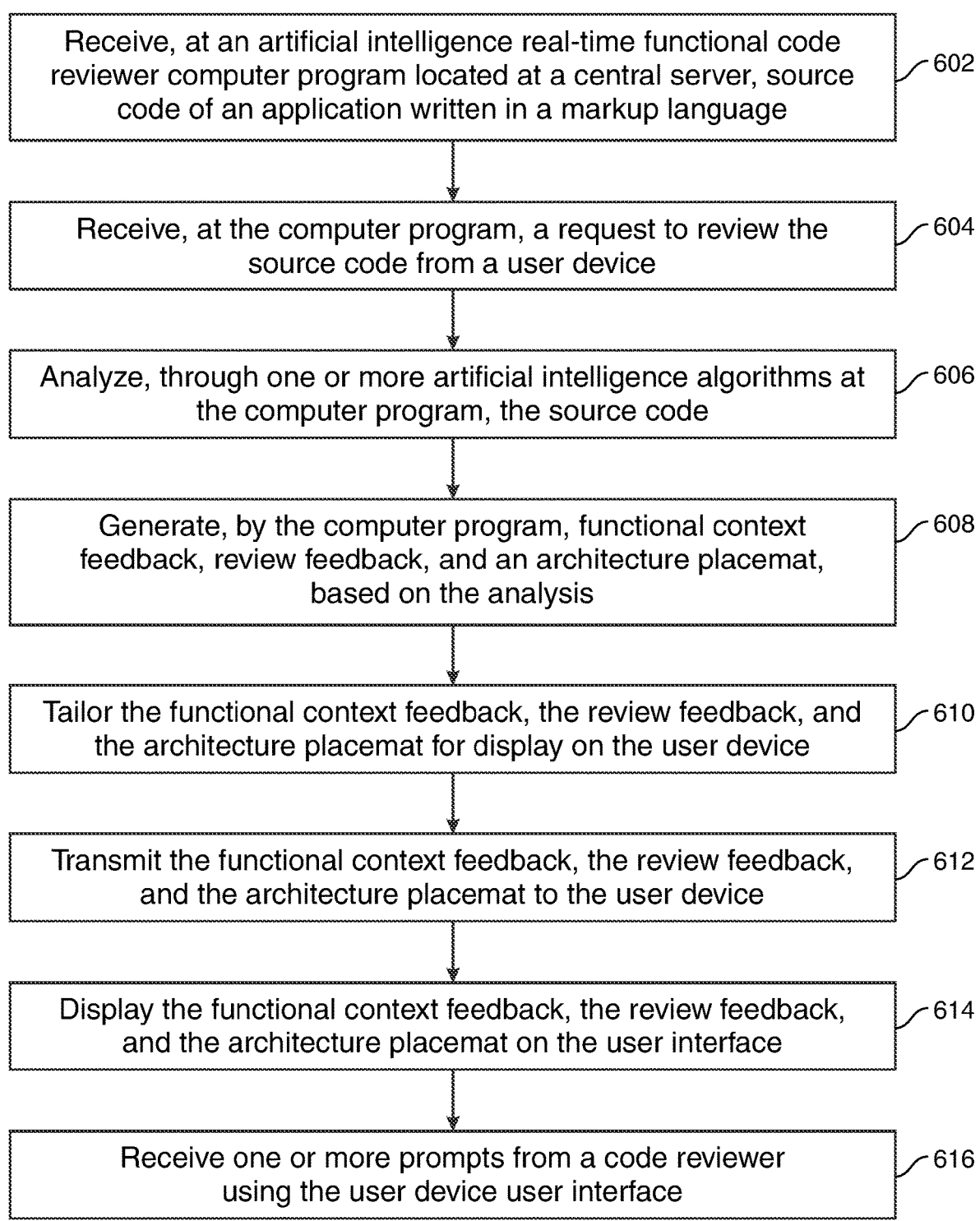

Receive, at an artificial intelligence real-time functional code reviewer computer program located at a central server, source code of an application written in a markup language — 602

Receive, at the computer program, a request to review the source code from a user device — 604

Analyze, through one or more artificial intelligence algorithms at the computer program, the source code — 606

Generate, by the computer program, functional context feedback, review feedback, and an architecture placemat, based on the analysis — 608

Tailor the functional context feedback, the review feedback, and the architecture placemat for display on the user device — 610

Transmit the functional context feedback, the review feedback, and the architecture placemat to the user device — 612

Display the functional context feedback, the review feedback, and the architecture placemat on the user interface — 614

Receive one or more prompts from a code reviewer using the user device user interface — 616

FIG. 6

REAL-TIME FUNCTIONAL CODE REVIEWER WITH ARCHITECTURE PLACEMAT

FIELD OF TECHNOLOGY

Aspects of the disclosure relate to providing apparatus and methods for a real-time functional code reviewer with an architecture placemat.

BACKGROUND OF THE DISCLOSURE

Code review is an essential element of proper software development and engineering. Multiple code review tools are available for various programming languages. These tools may check for static logic faults like null checks, missing mandatory conditional blocks, redundant code blocks and many other similar checks for improving code quality.

Generally, these review parameters are only applicable for certain languages like Java, .Net, python and the like. However, markup text and structural codes like .XML and .JSON do not have strong review principles and tools typically focus only on semantic validations.

For subject matter expert code reviewers, there is currently no method available for a system to represent functional code context of respective markup language-based structures and architectural impacts. For markup language code reviews, current systems and tools do not show functional feedback and architecture placemats (modules that are impacted with proposed changes and feedback to include more sub-objects).

Current markup language reviewing tools only validate semantic issues and parent level tags (code blocks), but it may not be possible for reviewers to understand potentially missed sub-objects which could cause dependent module failures due to recent changes as transitive dependencies may not be known to every reviewer.

Therefore, it would be desirable for apparatus and methods for a real-time functional code reviewer with an architecture placemat.

The present invention may ensure code reviews are not solely semantic and language checks and placement of architecture and functional review screens may help a reviewer (or multiple reviewers) understand the change from a functional and architectural impact perspective.

SUMMARY OF THE DISCLOSURE

It is an object of this disclosure to provide apparatus and methods for a real-time functional code reviewer with an architecture placemat.

An apparatus for a real-time functional code reviewer is provided. The apparatus may include a central server and a user device.

The central server may include a server communication link, a server processor, and a server non-transitory memory. The server non-transitory memory may be configured to store at least a server operating system and a real-time functional code reviewer program. The operating system and the code reviewer program may be executed on the server processor.

The user device may include a device communication link, a device processor, and a device non-transitory memory. The device memory may be configured to store at least a device operating system and a user interface of the real-time functional code reviewer program. The operating system and the user interface may be executed on the device processor.

The real-time functional code reviewer program may receive source code of an application written in a markup language.

The real-time functional code reviewer program may receive a request to review the source code.

The real-time functional code reviewer program may analyze, through one or more artificial intelligence algorithms, the source code.

The real-time functional code reviewer program may generate functional context feedback, based on the analysis.

The real-time functional code reviewer program may generate review feedback, based on the analysis.

The real-time functional code reviewer program may tailor the functional context feedback and review feedback for display on the user device.

The real-time functional code reviewer program may transmit the functional context feedback and the review feedback to the user device over the server and device communications links.

The user device may display the functional context feedback on the user interface.

The user device may display the review feedback on the user interface.

The user device may receive one or more prompts from a code reviewer using the user device. These prompt(s) may be transmitted to the central server over the device communications link.

In an embodiment, the one or more artificial intelligence algorithms may be trained with training data. The training data may include one or more goals specific to an entity.

In an embodiment, the code reviewer may be a developer.

In an embodiment, the analysis algorithm(s) may include a lexical parser.

In an embodiment, the analysis algorithm(s) may include a context analyzer.

In an embodiment, the user device may include an augmented-reality display (or capability).

In an embodiment, the user device may include a virtual-reality display (or capability).

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows an illustrative flowchart in accordance with principles of the disclosure.

DETAILED DESCRIPTION OF THE DISCLOSURE

Figure 1:
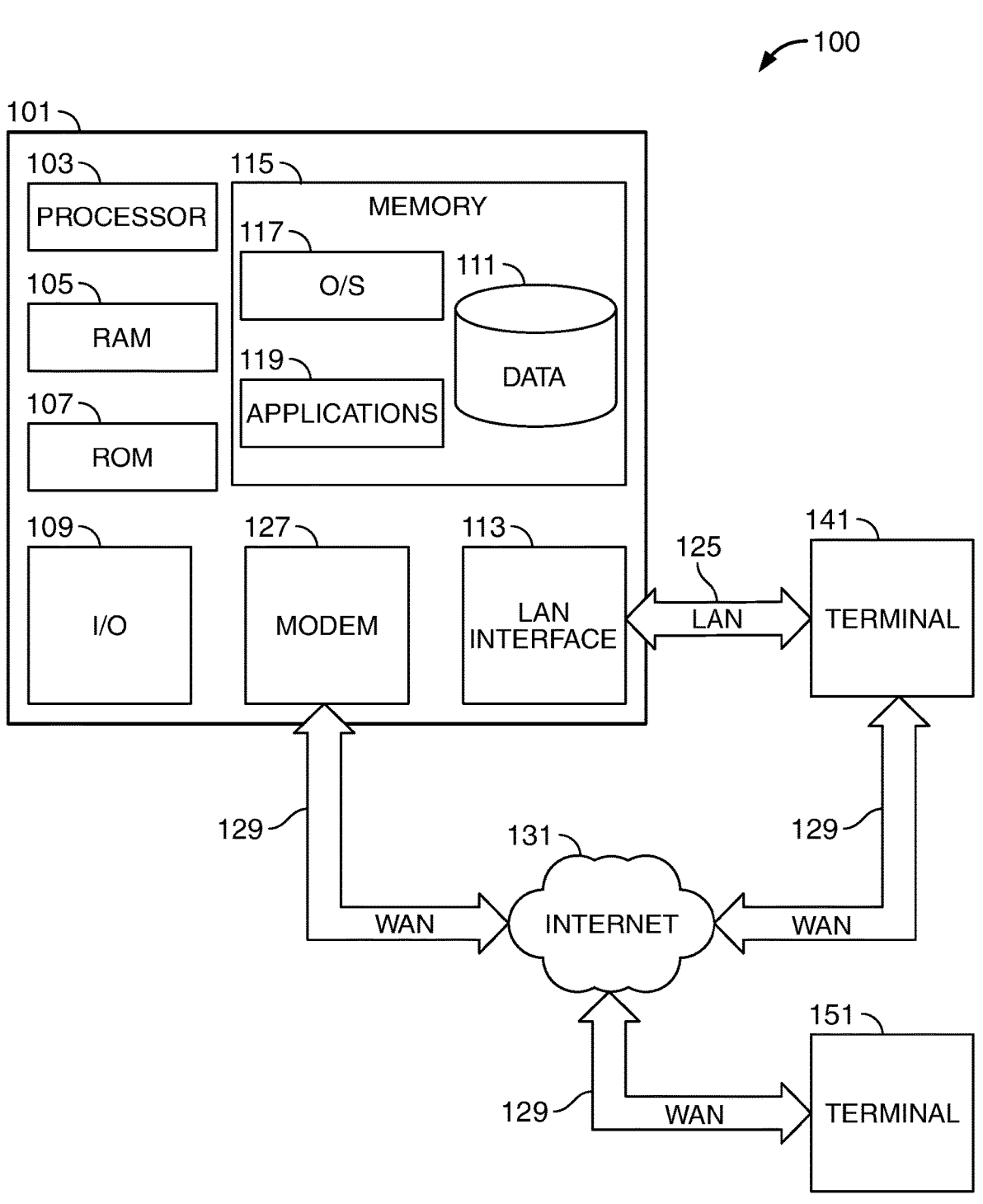
FIG. 1 shows an illustrative apparatus in accordance with principles of the disclosure.

It is an object of this disclosure to provide apparatus and methods for a real-time functional code reviewer with an architecture placemat.

An apparatus for a real-time functional code reviewer is provided. The apparatus may include a central server and one or more user devices.

In other embodiments, the server may be decentralized. A decentralized server may be more powerful than a centralized server but may be less secure and more expensive.

The central server may include a server communication link, a server processor, and a server non-transitory memory. The server non-transitory memory may be configured to store a server operating system, a real-time functional code reviewer program, as well as other applications and software. The operating system and the code reviewer program may be executed on the server processor.

The user device may include a device communication link, a device processor, and a device non-transitory memory. The device memory may be configured to store a device operating system, a user interface of the real-time functional code reviewer program, as well as other applications and software. The operating system and the user interface may be executed on the device processor.

The user interface may be a standalone application. The user interface may be a browser. The user interface may be accessible via a browser. The user interface may be a browser plugin or other application.

The user interface may permit a user to interact with the functional code-reviewer in real-time. The user interface may be graphical. The user interface may be textual. The user interface may include graphical, textual, and audiovisual elements.

In an embodiment, the user interface may be an augmented reality application, or include augmented reality capabilities. In this embodiment, the user device may be augmented reality capable, allowing a code reviewer to review the feedback in augmented reality.

In an embodiment, the user interface may be a virtual reality application, or include virtual reality capabilities. In this embodiment, the user device may be virtual reality capable, allowing a code reviewer to review the feedback in virtual reality.

In an embodiment, the user interface may be available on the server in addition to being available on one or more user devices.

In an embodiment, the user interface may be accessed through a browser.

In an embodiment, the user interface may be accessed through a separate application.

In an embodiment, the user interface may be accessed through a standalone application.

Other standard components of a computer system may be present, such as communication links, displays, input and output devices, read-only and random-access memory, and other components.

In various embodiments, standard components of spatial computing devices, such as augmented reality/virtual reality headsets, or smart glasses, or similar devices, may be present.

The term "non-transitory memory," as used in this disclosure, is a limitation of the medium itself, i.e., it is a tangible medium and not a signal, as opposed to a limitation on data storage types (e.g., RAM VS. ROM). "Non-transitory memory" may include both RAM and ROM, as well as other types of memory.

The non-transitory memory may be configured to store executable data configured to run on a standard processor.

The standard microprocessors may control the operation of the computer system and its components, which may include RAM, ROM, an input/output module, and other memory. Standard microprocessors or standard processors may refer to non-quantum processors.

Other components commonly used for computers, such as EEPROM or Flash memory or any other suitable components, may also be part of the apparatus and computer system.

A communication link may enable communication with other computers and servers, as well as enable the program to communicate with databases. The communication link may include any necessary hardware (e.g., antennae) and software to control the link. Any appropriate communication link may be used, such as Wi-Fi, bluetooth, LAN, and cellular links. Multiple communication links may be present. In an embodiment, the network used to communicate may be the Internet. In another embodiment, the network may be an internal intranet or other internal network.

The program or server may receive data (such as source code and analysis/programming rules) from a database or elsewhere. Some or all of the data may be pre-processed. Some or all of the data may require processing. Some or all of the data may be digital data. Some or all of the data may require conversion to digital data. Some or all of the data may be in the form of, or include, rules. Some or all of the data may be processed to convert the data to digital data. Some or all of the data may be training data. Some or all of the data may be real-world data, such as working source code. Some or all of the data may include historical data, such as past applications' source code. Some or all of the data may include real-time generated data. Some or all of the data may include multiple bytes of data.

The data may be received over a communication link. The data may be received from memory on the apparatus. The data may be transmitted automatically to the apparatus. The data may be transmitted by a system administrator, code developer, or other user.

The real-time functional code reviewer program may receive source code of an application written in a markup language. Markup languages may include .html, .xml, as well as .json and other similar languages, among others.

The real-time functional code reviewer program may receive a request to review the source code. The request may be received from a code reviewer, a developer, a system administrator, or others. In an embodiment, the request may be received from another application.

The real-time functional code reviewer program may analyze, through one or more artificial intelligence algorithms, the source code. Any suitable artificial intelligence algorithm or algorithms may be used. For example, the algorithm may be a large language model trained on markup languages.

The analysis may include a lexical parser, a context analyzer, and additional modules. The lexical parser may parse the language of the code looking for errors and other semantic information.

The context analyzer may analyze each line or module of the code in context with all or part of the remaining code. The context analyzer may determine the functional code context of the code as a whole, each line of the code, and each module or section of the code. Functional code context may help the analysis determine the effect of sub-objects (present or missing) and dependencies between modules. For example, if the code is missing a sub-object in one module, the functional code context analyzer may determine the effect of the missing sub-object. A missing sub-object may not appear in the lexical parser's analysis.

The analysis may also include effects of all or part of the source code on other existing applications.

The real-time functional code reviewer program may generate functional context feedback, based on the analysis.

The real-time functional code reviewer program may generate review feedback, based on the analysis. Review feedback may include suggested changes, highlights of different areas of the code for further review or analysis, highlights of different components of the code, and other high-level analysis of the code as a whole. In addition, the review feedback may include any issues found by the lexical parser, as well as suggestions on how to create better code or fix issues.

The real-time functional code reviewer program may tailor the functional context feedback and review feedback for display on the user device. As each user device may have different display capabilities, the results of the analysis may need to be tailored for display on specific devices. For example, the program may create a separate widget, or separate screen, for each type of feedback. The placement, size, and alignment of each widget may be tailored for a particular user device.

In an embodiment, each widget may be dynamically rendered by the user device, in real-time.

In an embodiment, when the review program receives the request to review the code from a user device, the request may include details on the user device to enable the program to tailor the feedback for display. For example, these details may include screen size, augmented reality or virtual reality capabilities, user preferences and other details.

The real-time functional code reviewer program may transmit the functional context feedback and the review feedback to the user device over the server and device communications links. In an embodiment, the reviewer program may initiate or create a communications channel between the server and user device. This channel may stay open until the user closes it or exits the user interface. Data may be transmitted over the channel, in either direction, in real-time. This data may include suggestions from the code reviewer/user or responses to suggestions made by the program from the code reviewer/user.

The user device may display the functional context feedback on the user interface.

The user device may display the review feedback on the user interface.

The user device may also display any other information received from the code reviewer program on the user interface.

In an embodiment, the displays may be modifiable or adjustable by the user/code reviewer.

The user device may receive one or more prompts from a code reviewer using the user device. These prompt(s) may be transmitted to the central server over the device communications link. These prompt(s) may include, for example, suggested changes to the code, positive feedback, negative feedback, the acceptance or rejection of suggested changes, and other prompts.

In an embodiment, the one or more artificial intelligence algorithms may be trained with training data. The training data may include one or more existing applications written in a markup language, other software applications, previous analyses, prompts, as well as defined rules.

In an embodiment, the code reviewer may be a developer. For example, the developer of the source code may request a review of the code by the program.

In an embodiment, the user device may include an augmented-reality display (or capability). Augmented reality display(s) may be present on smart glasses or other computing devices.

In an embodiment, the user device may include a virtual-reality display (or capability). Virtual reality displays may allow a user to manipulate the results of the program in a 3-dimensional space, or 3-dimensional space analogue.

An apparatus for a real-time functional code reviewer is provided. The apparatus may include a central server and two or more user devices. The user devices may be similar or identical. The user devices may have similar capabilities.

The central server may include a server communication link, a server processor, and a server non-transitory memory. The server non-transitory memory may be configured to store at least a server operating system and a real-time functional code reviewer program. The operating system and the code reviewer program may be executed on the server processor.

Each user device may include a device communication link, a device processor, and a device non-transitory memory. Each device memory may be configured to store at least a device operating system and a user interface of the real-time functional code reviewer program. The operating system and the user interface may be executed on the device processor.

The real-time functional code reviewer program may receive source code of an application written in a markup language.

The real-time functional code reviewer program may receive a request to review the source code from any of the two or more user devices.

The real-time functional code reviewer program may analyze, through one or more artificial intelligence algorithms, the source code.

The real-time functional code reviewer program may generate functional context feedback, based, at least, on the analysis.

The real-time functional code reviewer program may generate review feedback, based, at least, on the analysis.

The real-time functional code reviewer program may generate an architecture placemat, based, at least, on the analysis.

An architecture placemat may include a display of the modules of the source code, as well as modules of other applications that may be affected by the source code. An architecture placemat may be a graphical representation of the different modules or elements of the code. Various modules or areas of the architecture placemat may be highlighted by the program. Highlights may be used to show potential issues or other representations of the program. An architecture placemat may include lines or other connectors between modules or between modules of one application and other applications. An architecture placemat may include modules of other applications. An architecture placemat may include feedback associated with one or more modules. An architecture placemat may include suggestions for changes to the code from the program or a reviewer/user. An architecture placemat may appear similar to a flowchart.

In an embodiment, an architecture placemat may be optimized for display in augmented reality or virtual reality. The architecture placemat may display the modules in a 3-dimensional or 2-dimensional orientation. It may be preferable to display the placemat in a 3-dimensional orientation when the user device is augmented reality or virtual reality capable.

The real-time functional code reviewer program may tailor the functional context feedback, review feedback, and architecture placemat for display on each of the user devices.

The real-time functional code reviewer program may transmit the functional context feedback, the review feedback, and the architecture placemat to each of the user devices over the server and device communications links.

The user device may display the functional context feedback on the user interface.

The user device may display the review feedback on the user interface.

The user device may display the architecture placemat on the user interface.

Any of the user devices may receive one or more prompts from a code reviewer using that user device. These prompt(s) may be transmitted to the central server over the device communications link.

In an embodiment, the user interface may display the review feedback and architecture placemat after displaying the functional context feedback. Each of these feedbacks or placemats may appear on separate screens. Alternatively, each may appear in one or more portion of a screen, for example, as different areas of a display screen.

In an embodiment, the user interface may display the functional context feedback and the review feedback simultaneously. These may be displayed in the same screen, same window, etc. They may occupy different areas of the screen or window.

In an embodiment, the user interface may display the architecture placemat after displaying the functional context feedback and the review feedback.

In an embodiment, the real-time functional code reviewer program may generate one or more suggestions to improve the source code. The program may use one or more artificial intelligence/machine learning ("AI/ML") algorithms to generate the one or more suggestions. Any suitable AI/ML algorithm may be used.

In an embodiment, the real-time functional code reviewer program may display an option to accept or reject the one or more suggestions to the code reviewer.

In an embodiment, a location of the functional context feedback on the user interface may be adjustable by the code reviewer.

In an embodiment, a location of the architecture placemat on the user interface may be adjustable by the code reviewer.

In an embodiment, each of the two or more user devices may be a spatial computing device. A spatial computing device may be augmented reality ("AR") or virtual reality ("VR") capable, such as smart glasses or a VR headset.

In an embodiment, each spatial computing device may communicate over a network with every other spatial computing device. Communicating with other user devices may increase collaboration and increase the useability of a review.

A method for a real-time functional code reviewer is provided. The method may include the step of receiving, at an artificial intelligence real-time functional code reviewer computer program located at a central server, source code of an application written in a markup language.

The method may include the step of receiving, at the computer program, a request to review the source code from a user device.

The method may include the step of analyzing, through one or more artificial intelligence algorithms at the computer program, the source code.

The method may include the step of generating, by the computer program, functional context feedback.

The method may include the step of generating, by the computer program, review feedback.

The method may include the step of generating, by the computer program, an architecture placemat.

The method may include the step of tailoring, by the computer program, the functional context feedback, review feedback, and architecture placemat for display on the user device.

The method may include the step of transmitting the functional context feedback, the review feedback, and the architecture placemat to the user device.

The method may include the step of displaying the functional context feedback on a user interface of the user device.

The method may include the step of displaying the review feedback on the user interface.

The method may include the step of displaying the architecture placemat on the user interface.

The method may include the step of receiving one or more prompts from a code reviewer using the user device.

In an embodiment, the method may include the step of generating, by the computer program, one or more suggestions to revise the source code.

In an embodiment, the method may include the step of displaying the one or more suggestions on the user interface.

The user may then be able to accept or reject the suggestion(s) or provide further comment.

The code reviewer program may utilize one or more artificial intelligence/machine learning ("AI/ML") algorithms to perform one or more of its functions. Any suitable AI/ML algorithm may be used.

The code reviewer program may store data in a database. The data may include the source code, any analysis, the results of any analysis, the feedback displays, any prompts received, suggestions made, and other data. Storing the data may allow for valid record-keeping, auditing of the data and program, and provide a check on the validity of the analysis of the program for testing purposes.

The process of analyzing the source code may be iterative.

In an embodiment, the results of the analysis (e.g., the feedback displays) may be encrypted. Any suitable encryption method or algorithm may be used.

In an embodiment, the artificial intelligence algorithms may include generative artificial intelligence/machine learning ("AI/ML") code, to generate analyses and the feedback.

In an embodiment, the code review program may update the feedback and architecture placemat(s) in real-time based on the analysis, the prompts, and other data.

In an embodiment, the user device may be an augmented reality/virtual reality ("AR/VR") spatial computing device. This computing device may be a headset, smartphone, tablet, smart glasses, or similar device.

In an embodiment, the server may be centralized. In an embodiment, the server may be distributed, to utilize a larger pool of computing resources and provide redundancy. Centralized servers may be easier to secure but also provide a single failure point. Distributed servers may be more robust but may provide multiple avenues for malicious actors to target.

In an embodiment, the user interface may exist in a metaverse.

In an embodiment, the user interface may include a chat interface.

In an embodiment, the user interface may be accessed through a web browser.

In an embodiment, the user interface may be streamed to a user device.

In various embodiments, a user device may be any computing device, and may include AR/VR devices.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer or computer system 101. Computer 101 may alternatively be referred to herein as a "computing device" or "computing system". Computer 101 may be a quantum computer or part of a quantum computer. Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more standard microprocessors 103 for controlling the operation of the device and its associated components, and may include RAM 105, ROM 107, input/output module 109, and a memory 115. The processors 103 may also execute all software running on the computer 101—e.g., the operating system 117 and applications 119 such as an real-time functional code reviewer program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the real-time functional code reviewer program, an authentication engine, and security protocols) along with any other data 111 (e.g., traits and authentication information for users and entities) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

In an embodiment of the server 101, the processor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, microphone, or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

In an embodiment, apparatus 100 may consist of multiple servers 101, along with other devices.

Apparatus 100 may be connected to other systems, computers, servers, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. terminals 141 and 151 may be referred to as user devices. The network connections depicted in FIG. 1 include a local area network (LAN) 125 and a wide area network (WAN) 129 but may also include other networks. Server 101 may include a network interface controller (not shown), which may include a modem 127 and LAN interface or adapter 113, as well as other components and adapters (not shown).

When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The server may transmit data to any other suitable computer system. The server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be programs such as a real-time functional code reviewer program and/or security protocols. In an embodiment, the real-time functional code reviewer program may use one or more AI/ML algorithm(s). The various tasks may be related to analyzing source code for review.

Server 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, smart mobile device, or any other suitable device for receiving, storing, transmitting and/or displaying relevant information. Terminal 151 and/or terminal 141 may be other devices such as remote servers. The terminals 151 and/or 141 may be computers where the user is interacting with the application that is being monitored by apparatus 100.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, server computers, hand-held or laptop devices, tablets, mobile phones, smart phones, smart mobile devices, and/or other personal digital assistants ("PDAs"), multiprocessor systems, microprocessor-based systems, set top boxes, programmable consumer electronics, network PCS, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules maybe located in both local and remote computer storage media including memory storage devices.

Figure 2:
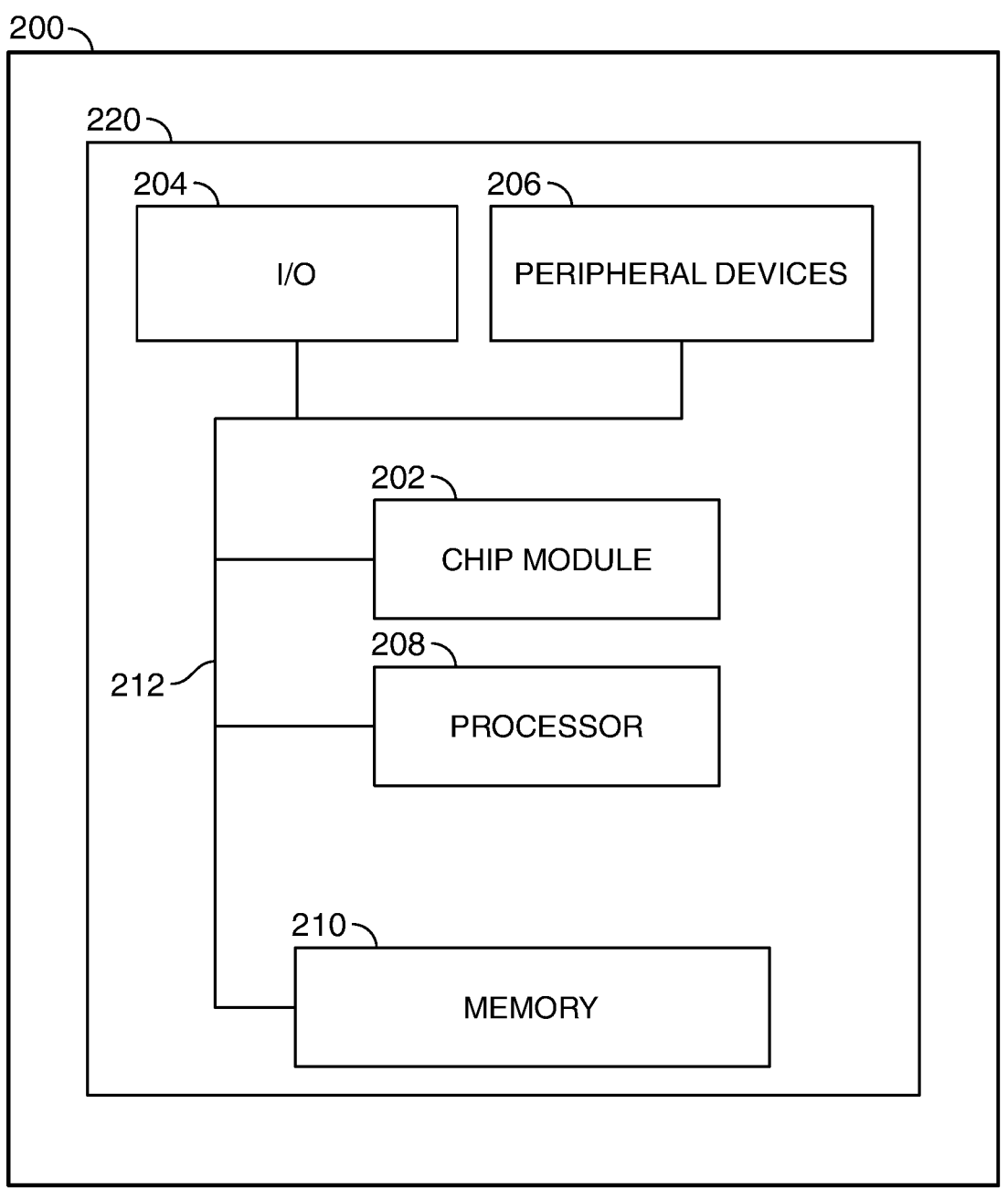
FIG. 2 shows an illustrative apparatus in accordance with principles of the disclosure.

FIG. 2 shows illustrative apparatus 200 that may be configured in accordance with the principles of the disclosure. Apparatus 200 may be a server, or computer with various peripheral devices 206. Apparatus 200 may include one or more features of the apparatus shown in FIGS. 1-7. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may be quantum based and may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
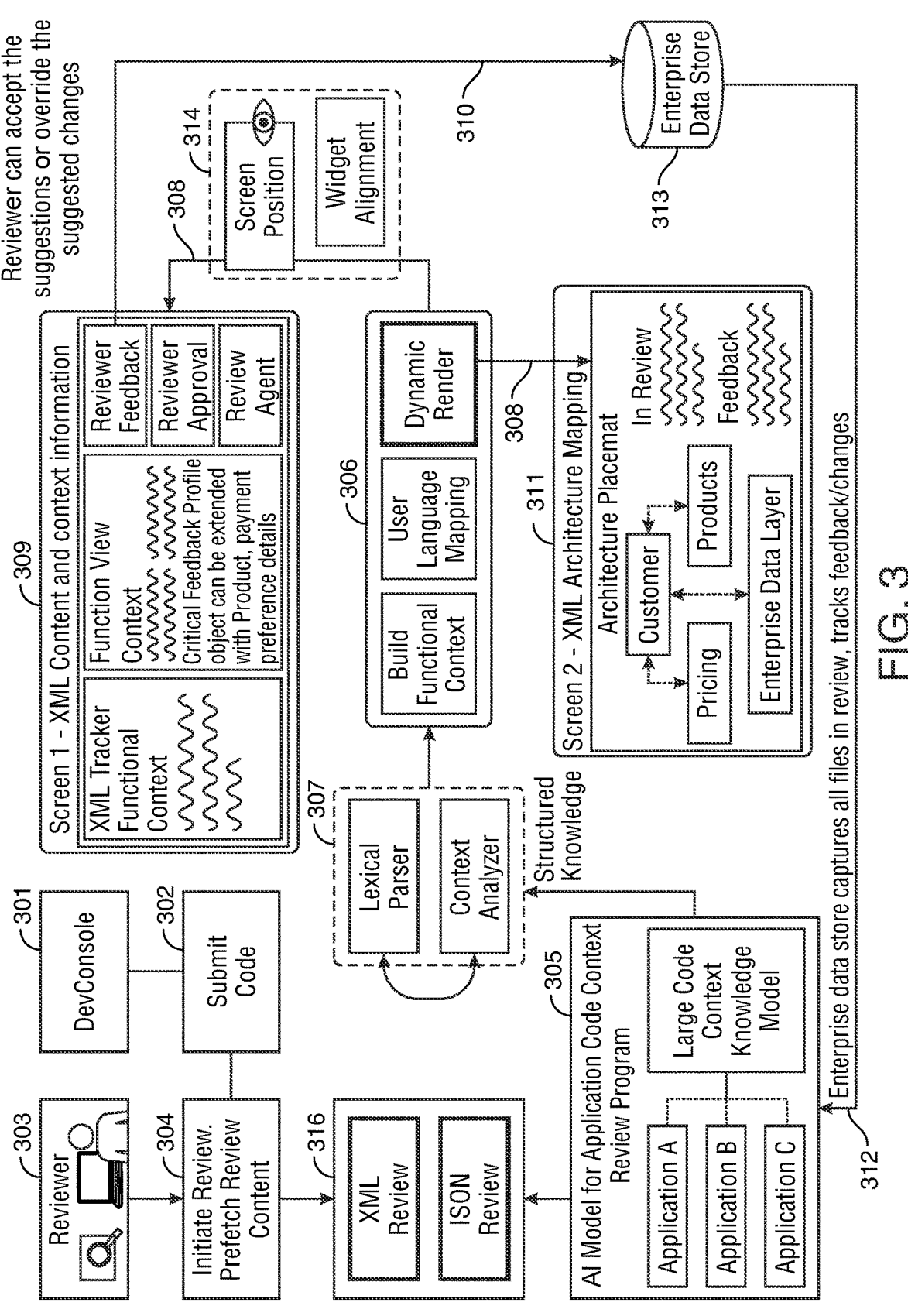
FIG. 3 shows an illustrative schematic in accordance with principles of the disclosure.

FIG. 3 shows an illustrative schematic in accordance with principles of the disclosure. Apparatus may be odd-numbered 301-315, while steps may be even-numbered 302-312. Methods may include some or all of the method steps numbered 302 through 312. Methods may include the steps illustrated in FIG. 3 in an order different from the illustrated order. The illustrative method shown in FIG. 3 may include one or more steps performed in other figures or described herein. Steps 302 through 312 may be performed on the apparatus shown in FIGS. 1-7, or other apparatus.

A developer may create source code for an application on a developer console 301. The developer may submit the code for review at step 302.

A code reviewer 303 may initiate a review of the code at step 304. The source code may be prefetched before a review is initiated. Prefetched may refer to code that is submitted prior to a review being initiated.

An artificial intelligence/machine learning real-time functional code reviewer program 305 may include various modules, such as a lexical parser and context analyzer 307. The reviewer program 305 may perform an xml/json (or other similar markup or similar language) review 315 at step 306.

The review at step 306 may include building a functional context of the source code, mapping the language, rendering feedback dynamically, and other activities.

At step 308, the code reviewer program 305 may analyze the code and generate two or more display screens, including feedback/review screen 309 and architecture mapping/placemat screen 311.

Feedback screen 309 may include the code, a context description, context feedback, review feedback, and additional widgets such as reviewer feedback, reviewer approval, suggested changes, and a description of the reviewer, among other widgets or information.

Architecture mapping screen 311 may include an architecture placemat that graphically shows a representation of the code modules. The mapping screen 311 may include a review area, as well as feedback, among other widgets or information.

Screens 309 and 311 and elements therein may be adjusted by the program 305 or by the reviewer 303.

At step 310 the code reviewer 303 may accept or reject suggested changes.

The analysis, source code, screens 309 and 311, feedback, accepted and rejected suggestions, and other information may be stored in database 313.

At step 312, the information stored in database 313 may be transmitted to the program 305 so that program 305 may learn and iterate.

Figure 4:
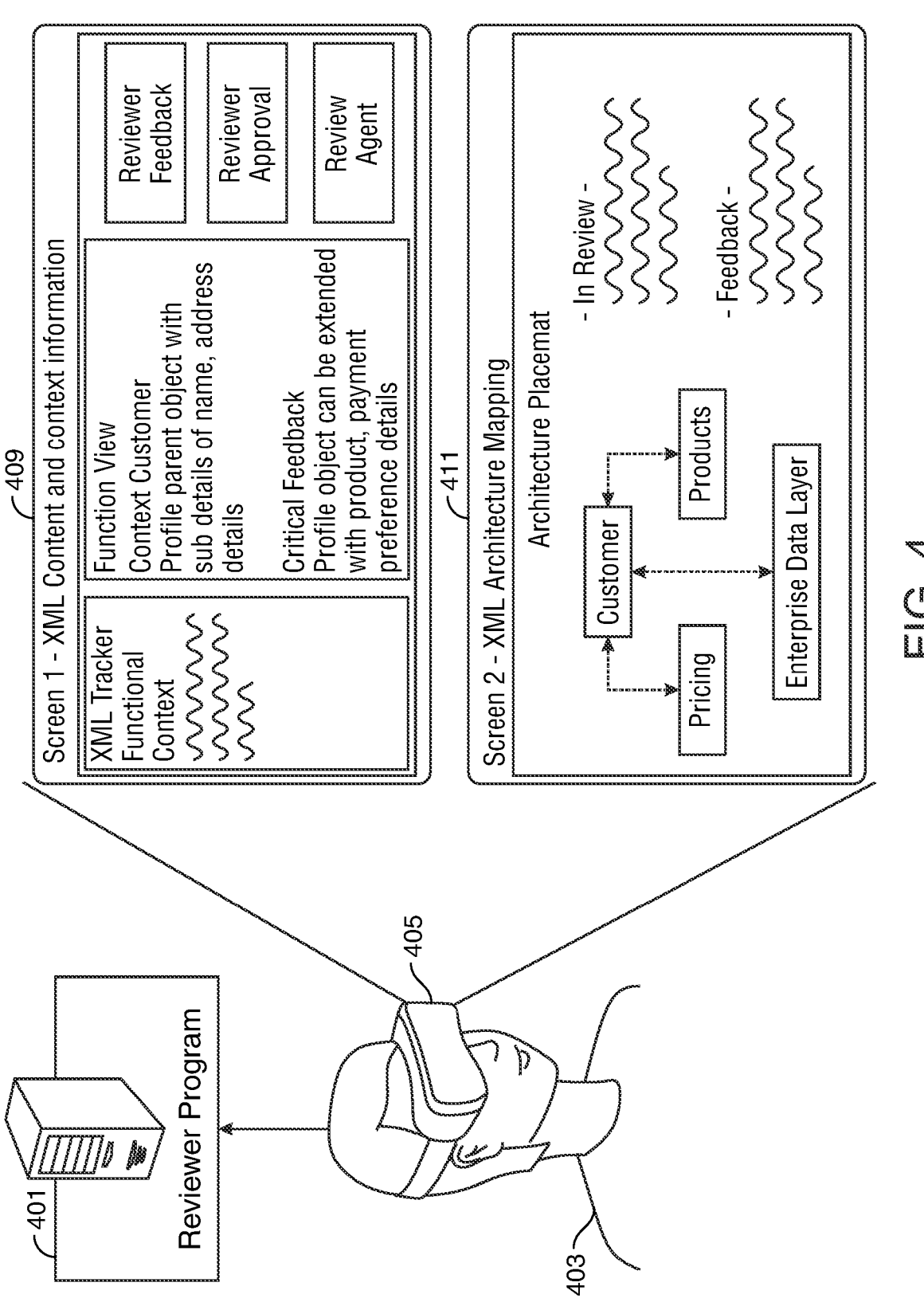
FIG. 4 shows an illustrative schematic in accordance with principles of the disclosure.

FIG. 4 shows an illustrative diagram in accordance with principles of the disclosure.

Source code may be developed in a devops environment and transmitted to a reviewer program 401 on a server (centralized or decentralized).

A code reviewer 403 may initiate a review of the source code by the reviewer program 401. The results of the review may be transmitted in real-time to a spatial computing device 405 worn or used by the code reviewer 403.

The spatial computing device may display two or more screens (sequentially or together), including feedback/review screen 409 and architecture mapping/placemat screen 411.

Feedback screen 409 may include the code, a context description, context feedback, review feedback, and additional widgets such as reviewer feedback, reviewer approval, suggested changes, and a description of the reviewer, among other widgets or information.

Architecture mapping screen 411 may include an architecture placemat that graphically shows a representation of the code modules. The mapping screen 411 may include a review area, as well as feedback, among other widgets or information.

Figure 5:
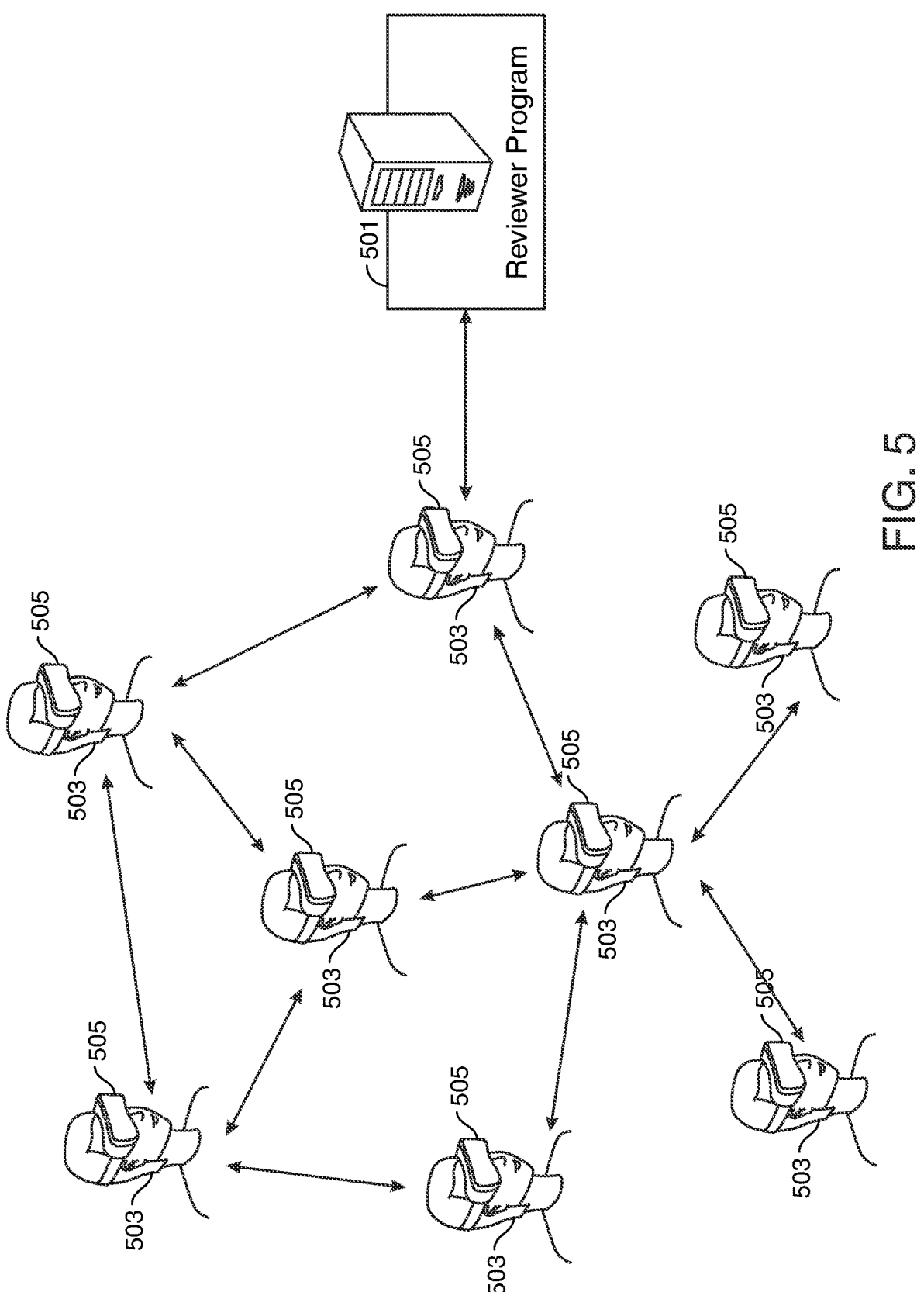
FIG. 5 shows an illustrative schematic in accordance with principles of the disclosure.

FIG. 5 shows an illustrative schematic in accordance with principles of the disclosure.

Source code may be developed in a devops environment and transmitted to a reviewer program 501 on a server (centralized or decentralized).

One or more code reviewers 503 may initiate a review of the source code by the reviewer program 501. The results of the review may be transmitted in real-time to a spatial computing device 505 worn or used by each code reviewer 503.

The spatial computing device may display two or more screens (sequentially or together), including a feedback/review screen and an architecture mapping/placemat screen.

Each reviewer 503 and spatial computing device 505 may be networked together and each may review the analysis and results of the reviewer program 501 simultaneously.

In an embodiment, each reviewer 503 may enter a metaverse or other virtual reality space along with the other reviewers 503. Each reviewer 503 may review the analysis and results of the reviewer program 501 in the metaverse or other virtual reality space.

FIG. 6 shows an illustrative flowchart in accordance with principles of the disclosure. Methods may include some or all of the method steps numbered 602 through 616. Methods may include the steps illustrated in FIG. 6 in an order different from the illustrated order. The illustrative method shown in FIG. 6 may include one or more steps performed in other figures or described herein. Steps 602 through 616 may be performed on the apparatus shown in FIGS. 1-7, or other apparatus.

At step 602, an AI/ML real-time functional code reviewer program on a server, may receive source code of an application written in a markup language. The server may be centralized or distributed.

At step 604, the code reviewer program may receive a request to review the source code from a user device. The user device may be a spatial computing device.

At step 606, the real-time functional code reviewer program may analyze, through one or more artificial intelligence algorithms, the source code.

At step 608, the real-time functional code reviewer program may generate functional context feedback, review feedback, and an architecture placemat. Each of these generated feedbacks or placemats may be based on the analysis performed at step 606.

At step 610, the real-time functional code reviewer program may tailor the functional context feedback, review feedback, and the architecture placemat for display on the user device.

At step 612, the real-time functional code reviewer program may transmit the functional context feedback, review feedback, and the architecture placemat, as tailored at step 610, to the user device.

At step 614, the user device may display the functional context feedback, review feedback, and the architecture placemat received at step 612 on a user interface of the user device. In an embodiment, the user interface may be augmented reality/virtual reality capable.

At step 616, the code reviewer program may receive one or more prompts from a code reviewer using the user device user interface. The prompts may be additional feedback, acceptance or rejection of suggested changes, and other information.

Figure 7:
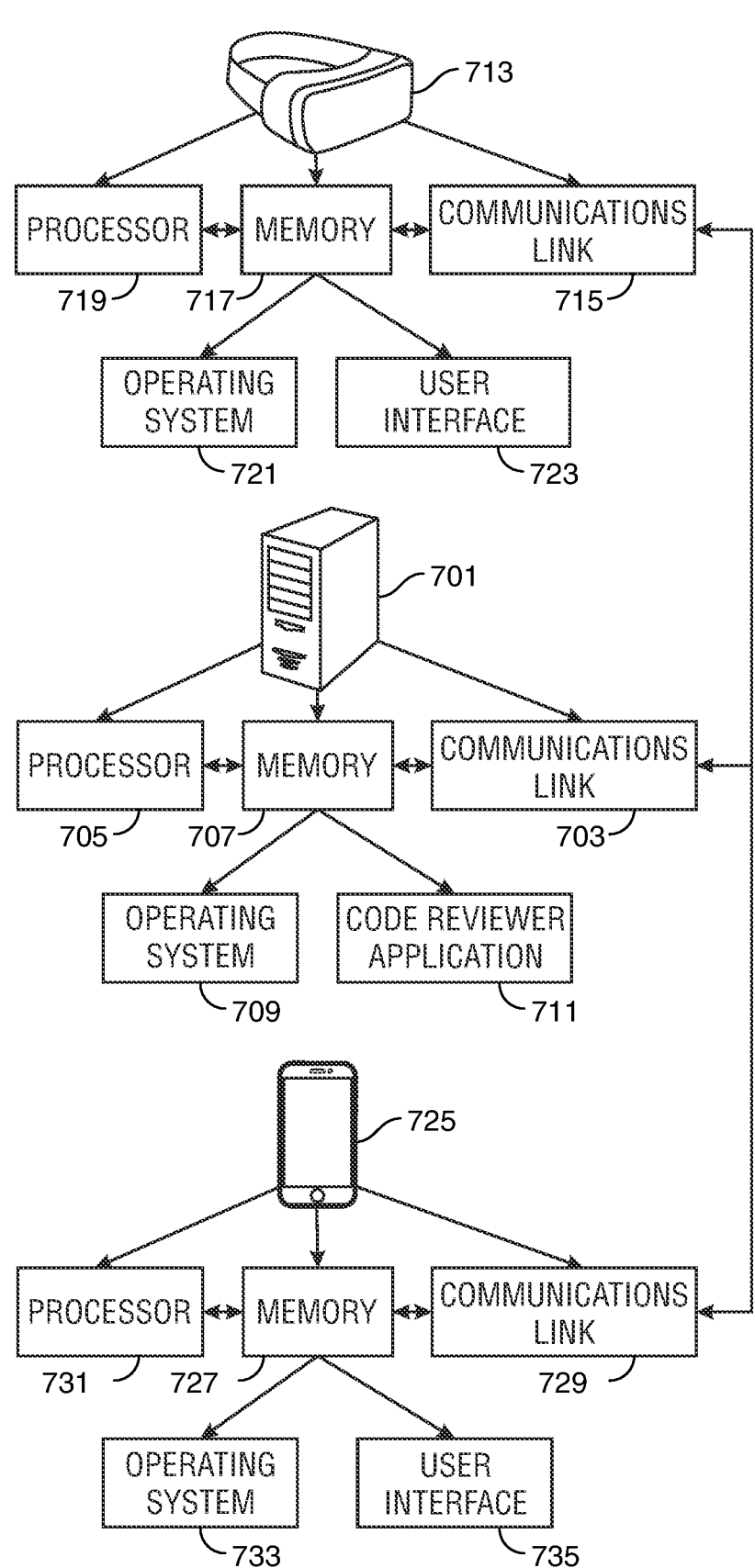
FIG. 7 shows an illustrative apparatus in accordance with principles of the disclosure.

FIG. 7 shows an illustrative apparatus in accordance with principles of the disclosure. The apparatus may include a computer system/server 701, a first user device 713, and a second user device 725. Computer system 701 may be a centralized or decentralized server.

Server 701 may include a server communications link 703, a server processor or processors 705, a server non-transitory memory 707, as well as other components, such as a graphical user interface.

The server non-transitory memory 707 may include an operating system 709, as well as a real-time functional code reviewer application 711, as well as other data and programs.

The communications link 703 may communicate with other computer systems and databases over a network. The network may be the Internet, an internal intranet, or other network.

First user device 713 may include a first user device communications link 715, a first user device processor/processors 719, a first user device non-transitory memory 717, as well as other components, The first user device non-transitory memory 717 may include an operating system 721, as well as a user interface for a real-time functional code reviewer application 723, as well as other data and programs.

The first user device 713 may communicate with the server 701 and second user device 725 over communications link 715.

The second user device 725 may include a second user device communications link 731, a second user device processor/processors 729, a second user device non-transitory memory 727, as well as other components, The second user device non-transitory memory 727 may include an operating system 733, as well as a user interface for a real-time functional code reviewer application 735, as well as other data and programs.

The second user device 725 may communicate with the server 701 and first user device 713 over communications link 731.

Additional user devices may be present as well.

The real-time functional code reviewer program 711 may receive source code of an application written in a markup language.

The real-time functional code reviewer program 711 may receive a request to review the source code from one of the two or more user devices 713 or 725. Each user device may be a spatial computing device.

The real-time functional code reviewer program 711 may analyze, through one or more artificial intelligence algorithms, the source code.

The real-time functional code reviewer program 711 may generate functional context feedback, generate review feedback, and generate an architecture placemat.

The real-time functional code reviewer program 711 may tailor the functional context feedback, review feedback, and architecture placemat for display on each of the two or more user devices 713 and 725.

The real-time functional code reviewer program 711 may transmit the functional context feedback, the review feedback, and the architecture placemat to each of the two or more user devices 713 and 725 over server communications link 703.

Each of the two or more user devices may display the functional context feedback, the review feedback, and the architecture placemat on the user interface 723 or 735 respectively.

The real-time functional code reviewer program 711 may receive one or more prompts from a code reviewer using one of the two or more user devices 713 or 725.

Thus, apparatus and methods for a real-time functional code reviewer with an architecture placemat are provided. Persons skilled in the art will appreciate that the present invention can be practiced by other than the described embodiments, which are presented for purposes of illustration rather than of limitation.

What is claimed is:

1. An apparatus for a real-time functional code reviewer, the apparatus comprising:
   a central server, the central server comprising:
      a server communication link;
      a server processor; and
      a server non-transitory memory configured to store at least:
         a server operating system; and
         a real-time functional code reviewer program executed on the server processor; and
      a user device, the user device comprising:
         a device communication link;
         a device processor; and
         a device non-transitory memory configured to store at least:
            a device operating system; and
            a user interface of the real-time functional code reviewer program executed on the device processor;
   wherein the real-time functional code reviewer program:
      receives source code of an application written in a markup language;
      receives a request to review the source code;
      analyzes, through one or more artificial intelligence algorithms, the source code;

generates functional context feedback;
      generates review feedback;
      tailors the functional context feedback and review feedback for display on the user device; and
      transmits the functional context feedback and the review feedback to the user device; and
   wherein the user device:
      displays the functional context feedback on the user interface;
      displays the review feedback on the user interface; and
      receives one or more prompts from a code reviewer using the user device.

2. The apparatus of claim 1 wherein the one or more artificial intelligence algorithms are trained with training data, wherein the training data comprises one or more goals specific to an entity.

3. The apparatus of claim 1 wherein the code reviewer is a developer.

4. The apparatus of claim 1 wherein the analysis comprises a lexical parser.

5. The apparatus of claim 1 wherein the analysis comprises a context analyzer.

6. The apparatus of claim 1 wherein the user device comprises an augmented-reality display.

7. The apparatus of claim 1 wherein the user device comprises a virtual-reality display.

8. An apparatus for a real-time functional code reviewer, the apparatus comprising:
   a central server, the central server comprising:
      a server communication link;
      a server processor; and
      a server non-transitory memory configured to store at least:
         a server operating system; and
         a real-time functional code reviewer program executed on the server processor; and
   two or more user devices, wherein each user device comprises:
      a device communication link;
      a device processor; and
      a device non-transitory memory configured to store at least:
         a device operating system; and
         a user interface of the real-time functional code reviewer program executed on the device processor;
   wherein the real-time functional code reviewer program:
      receives source code of an application written in a markup language;
      receives a request to review the source code from one of the two or more user devices;
      analyzes, through one or more artificial intelligence algorithms, the source code;
      generates functional context feedback;
      generates review feedback;
      generates an architecture placemat;
      tailors the functional context feedback, review feedback, and architecture placemat for display on each of the two or more user devices; and
      transmits the functional context feedback, the review feedback, and the architecture placemat to each of the two or more user devices; and
   wherein each of the two or more user devices:
      displays the functional context feedback on the user interface;
      displays the review feedback on the user interface;

displays the architecture placemat on the user interface; and receives one or more prompts from a code reviewer using one of the two or more user devices.

9. The apparatus of claim 8 wherein the user interface displays the review feedback and architecture placemat after displaying the functional context feedback.

10. The apparatus of claim 8 wherein the user interface displays the functional context feedback and the review feedback simultaneously.

11. The apparatus of claim 10 wherein the user interface displays the architecture placemat after displaying the functional context feedback and the review feedback.

12. The apparatus of claim 8 wherein the real-time functional code reviewer program generates one or more suggestions to improve the source code.

13. The apparatus of claim 12 wherein the real-time functional code reviewer program displays an option to accept or reject the one or more suggestions to the code reviewer.

14. The apparatus of claim 8 wherein a location of the functional context feedback on the user interface is adjustable by the code reviewer.

15. The apparatus of claim 8 wherein a location of the architecture placemat on the user interface is adjustable by the code reviewer.

16. The apparatus of claim 8 wherein each of the two or more user devices is a spatial computing device.

17. The apparatus of claim 16 wherein each spatial computing device communicates over a network with every other spatial computing device.

18. A method for a real-time functional code reviewer, the method comprising:

receiving, at an artificial intelligence real-time functional code reviewer computer program located at a central server, source code of an application written in a markup language;

receiving, at the computer program, a request to review the source code from a user device;

analyzing, through one or more artificial intelligence algorithms at the computer program, the source code;

generating, by the computer program, functional context feedback;

generating, by the computer program, review feedback;

generating, by the computer program, an architecture placemat;

tailoring the functional context feedback, review feedback, and architecture placemat for display on the user device;

transmitting the functional context feedback, the review feedback, and the architecture placemat to the user device;

displaying the functional context feedback on a user interface of the user device;

displaying the review feedback on the user interface;

displaying the architecture placemat on the user interface; and receiving one or more prompts from a code reviewer using the user device.

19. The method of claim 18 further comprising the step of generating, by the computer program, one or more suggestions.

20. The method of claim 19 further comprising the step of displaying the one or more suggestions on the user interface.

* * * * *